No. 731,663. PATENTED JUNE 23, 1903.
W. T. & G. P. CARR & H. E. WILLIAMS.
BALING PRESS.
APPLICATION FILED DEC. 13, 1902.
NO MODEL. 3 SHEETS—SHEET 1.
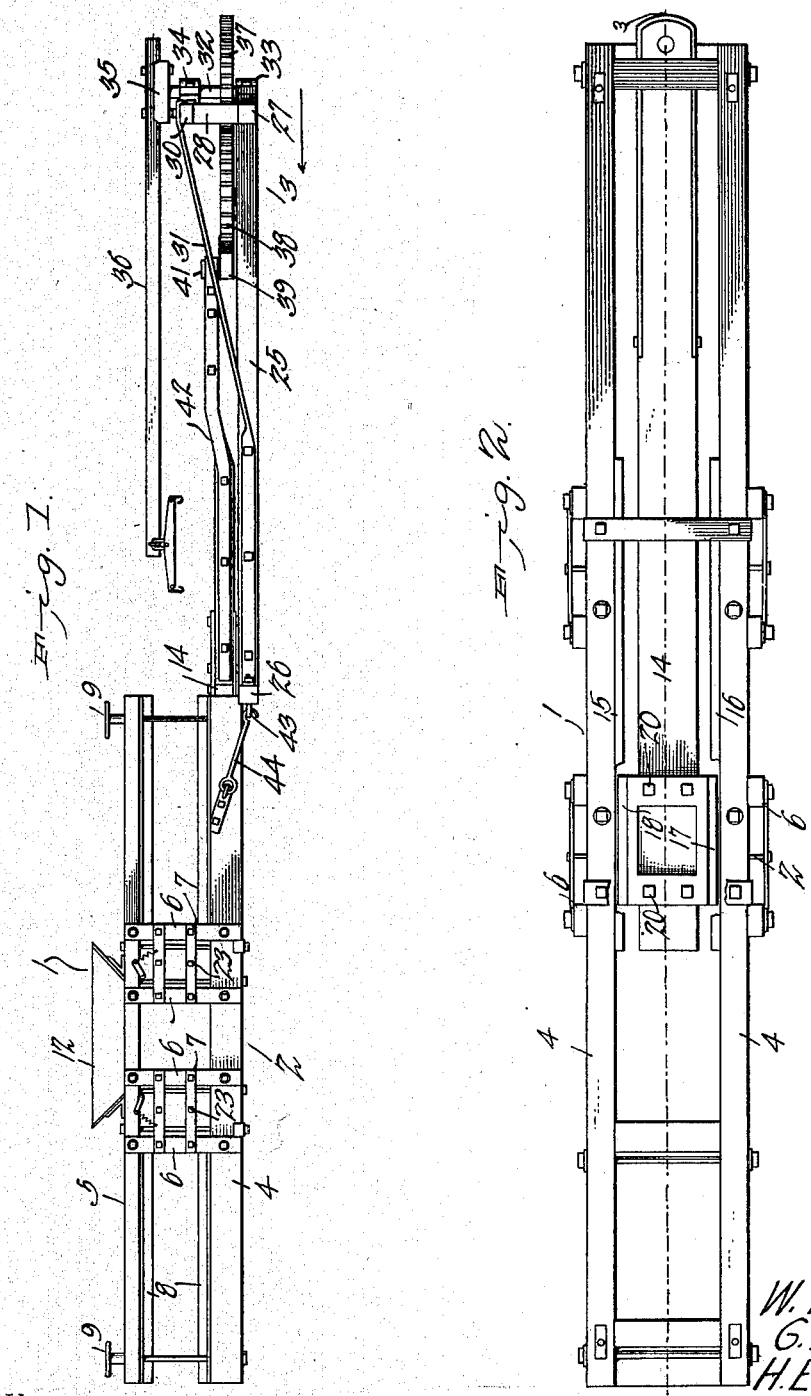
Witnesses
W. T. Carr,
G. P. Carr and
H. E. Williams,
Inventors
by C. A. Snow & Co.
Attorneys

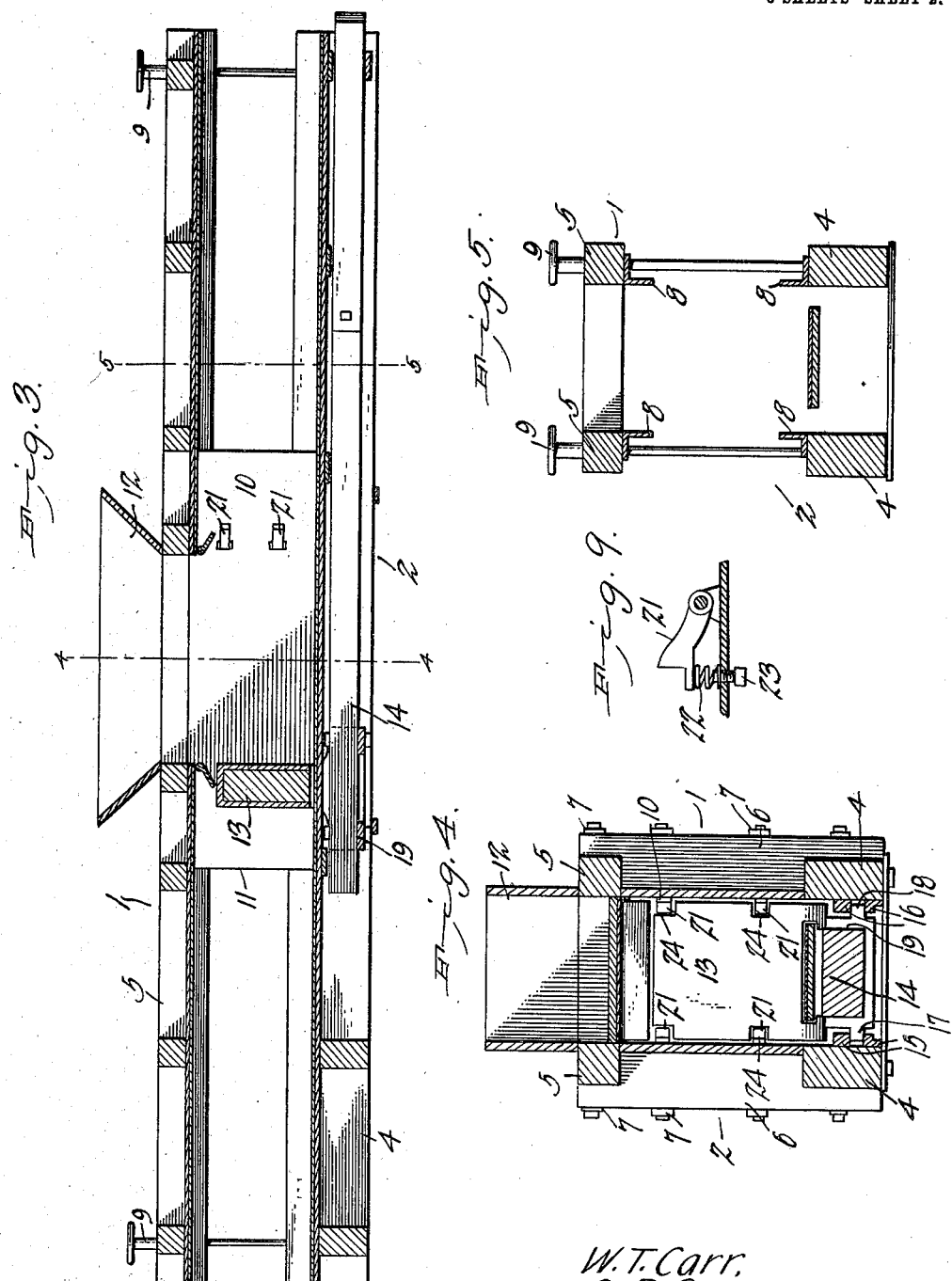

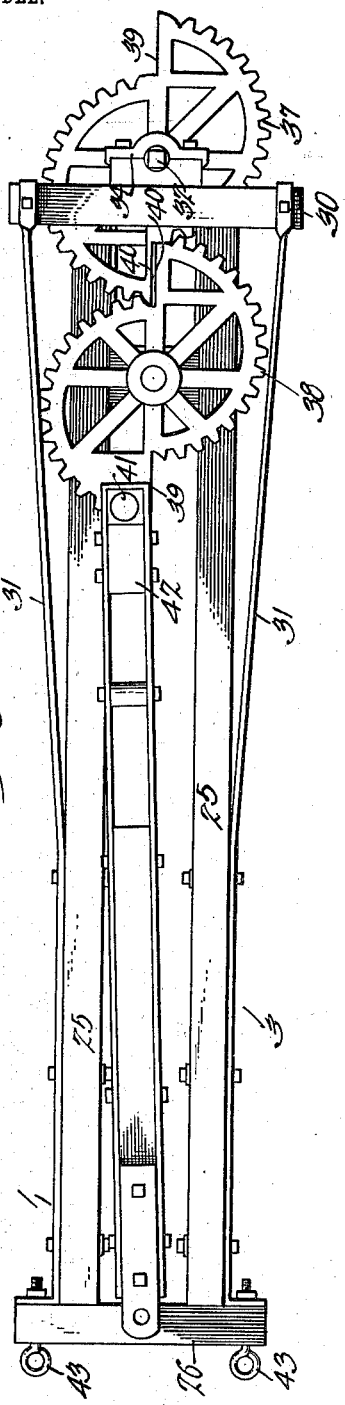
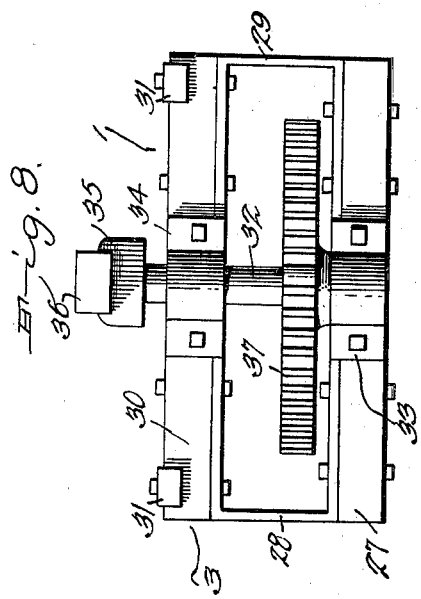
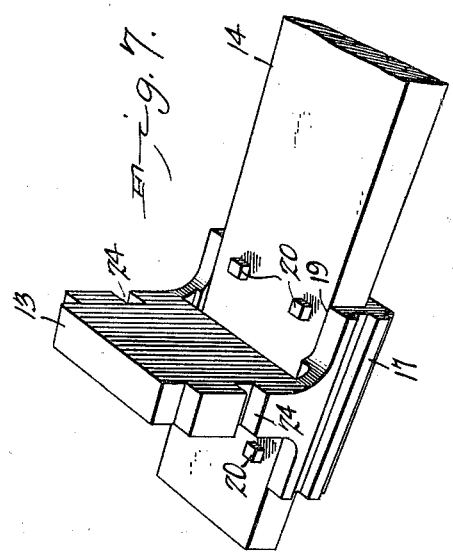

No. 731,663.

Patented June 23, 1903.

UNITED STATES PATENT OFFICE.

WILLIAM T. CARR, GRIFFIN P. CARR, AND HENRY E. WILLIAMS, OF SAVANNAH, TENNESSEE, ASSIGNORS OF ONE-FOURTH TO A. U. WALKER, OF SAVANNAH, TENNESSEE.

BALING-PRESS.

SPECIFICATION forming part of Letters Patent No. 731,663, dated June 23, 1903.

Application filed December 13, 1902. Serial No. 135,111. (No model.)

*To all whom it may concern:*

Be it known that we, WILLIAM T. CARR, GRIFFIN P. CARR, and HENRY E. WILLIAMS, citizens of the United States, residing at Savannah, in the county of Hardin and State of Tennessee, have invented a new and useful Baling-Press, of which the following is a specification.

Our invention relates to baling-presses, and has for its primary object to simplify and improve upon the construction and operation of the baling block or plunger and its operating-bar and to so mount the latter that it will be free of the path of the incoming material.

A further object of the invention is to provide an improved form of gearing for operating the plunger and for imparting to the same a differential motion which will decrease in rapidity at the end of the stroke to increase the pressure exerted on the baling-head and in which, at the termination of the stroke, there will be a slight pause or dwell.

To these ends the invention comprises, in a baling-press, the combination, with a baling-chamber, of a baling block or plunger, a horizontally-disposed plunger-operating bar mounted beneath the baling-chamber, and means for reciprocating the bar.

The invention further consists in the details of construction more fully hereinafter described and claimed.

In the accompanying drawings, Figure 1 is a side elevation of a baling-press embodying our invention. Fig. 2 is a bottom plan view of the body of the press, the power mechanism being removed. Fig. 3 is a longitudinal section through the machine on the line 3 3 of Fig. 2. Fig. 4 is a vertical transverse section on the line 4 4 of Fig. 3. Fig. 5 is a similar view on line 5 5 of Fig. 3. Fig. 6 is a top plan view of the front section or power mechanism of the machine, the parts being in the position of the termination of the forward or thrusting stroke of the plunger. Fig. 7 is a perspective view of the plunger and plunger-bar removed from the machine. Fig. 8 is a front elevation of the power-section viewed in the direction of the arrow in Fig. 1.

Referring to the drawings, 1 indicates our press as a whole, the various parts of which may be made of any suitable or desired material. This machine consists of a rear or baling section proper, 2, and a forward or power section 3. The rear baling-section 2 comprises the usual sills 4 and top rails 5, secured together by uprights 6, which latter are further braced by metal braces 7. Suitably secured to the sills and top rails are angle-irons 8, (plainly shown in Fig. 5,) which constitute the sides of the baling-press and serve as guides for the bales.

9 indicates four pressure-screws, mounted one at each corner of the machine and operated by hand-wheels to regulate the pressure on the bales.

10 and 11 are two baling-chambers into which the material to be baled is fed through a hopper 12, which is common to both.

13 is a baling block or plunger mounted beneath the hopper 12 between the baling-chambers and adapted to be reciprocated by a plunger-bar 14, which receives motion from a suitable power mechanism. The plunger in its reciprocatory motion acts alternately upon the hay in the respective chambers 10 and 11.

Mounted upon the inner side of each of the sills is a pair of horizontal rails or guides 15 and 16, spaced vertically sufficiently to permit the passage and guiding between them of flanges 17 and 18, suitably formed one on either side of the plunger. By this construction it will be seen that the plunger is efficiently guided and steadied in its reciprocations.

The plunger-bar 14, which, as above stated, reciprocates the plunger, is mounted at the bottom of the machine and operates beneath the baling-chambers, in which position it will be out of the path of and offer no obstruction to the incoming hay. The plunger 13 has a slot or mortise 19 formed near its bottom for the reception of the end of the plunger-bar, to which it is securely fastened by bolts or rivets 20, as clearly shown in Fig. 7.

21 indicates spring-dogs mounted upon vertical axes on the inner sides of baling-chambers at the entrance to the same to prevent the charge from rebounding upon the withdrawal of the plunger.

22 indicates tension-springs which bear upon the dogs, and 23 indicates screws for varying the tension of the springs.

24 24 are horizontal grooves formed in the sides of the plunger to permit the passage of the dogs 21.

Referring now to the forward or power section 3 of the machine, 25 indicates two horizontal bars or sills connected at their rear end by a cross-beam 26 and at their forward end by a similar beam 27. Arising from the latter beam are two angle-irons 28 29, to the tops of which is secured an overhead transverse beam 30, which is braced by rods 31, secured thereto and to the horizontal bars 25.

32 is a vertical driving-shaft mounted in suitable bearings 33 and 34, secured, respectively, to the transverse beams 27 and 30.

35 is a head suitably mounted and secured upon the top of the driving-shaft and to which is attached, by bolts, one end of a power-lever 36, adapted to be operated by animals in the usual manner.

37 is a double-cammed or eccentric driving-gear suitably fixed upon the driving-shaft near to its lower end and adapted to be operated thereby.

38 is a second double-cammed or eccentric gear meshing with and adapted to be driven by the driving-gear 37. As these gears are identical in formation, I will describe that of but one, such description being understood as applying to both.

39 and 40 indicate two radial vertical faces each of a length equal to about half the radius of the wheel, which faces practically divide the teeth of the gear into two equal sections, the teeth of each section beginning at the inner end of the face adjacent thereto and continuing eccentrically to the outer end of the other face; or, in other words, the teeth on one section of the wheel begin at the inner end of the face 39 and terminate at the outer end of face 40, while those of the other section begin at the inner end of face 40 and terminate at the outer end of face 39.

The wheels 37 and 38 are so mounted that the teeth having the greatest eccentricity on the former will mesh with those having the least eccentricity on the latter. Thus it will be seen that the driven wheel will at the beginning of the stroke travel at a high rate of speed, which gradually decreases until the end of the stroke is reached, for the purpose to be explained.

41 is a vertical stub arising from the upper horizontal face of the gear 38 and engaging the forward end of the pitman 42, which latter is suitably pivoted at its rear end to the forward end of the plunger-bar. From this construction it will be seen that the gear 38 will impart to the pitman a differential reciprocatory motion, which in turn is transmitted to the plunger-bar and plunger, the motion being rapid at the beginning of the stroke and slower at its completion, thus at its termination exerting the greatest amount of pressure on the material. In this connection it may be remarked that at the termination of the stroke the gear-wheels will have reached a point where their respective faces 39 and 40 meet, producing lost motion and causing a slight pause or dwell to the plunger, thus at the time when it is exerting the greatest pressure on the material holding it momentarily in such position.

43 indicates eyebolts mounted at the ends of beam 26 in position to be engaged by hooked rods 44, carried by the sills 4 of the rear baling-section, thus connecting the two sections of the machine when in operation.

Having thus described our invention, what we claim is—

In a baling-press, the combination with a baling-chamber, of a baling-block or plunger, horizontal tracks or guides therefor, flanges on the block adapted to travel on the tracks or guides, a horizontal plunger-operating bar connected with the plunger and adapted to be reciprocated, and means for reciprocating the bar.

In testimony that we claim the foregoing as our own we have hereto affixed our signatures in the presence of two witnesses.

WILLIAM T. CARR.
GRIFFIN P. CARR.
HENRY E. WILLIAMS.

Witnesses:
A. J. WILLIAMS,
J. J. WILLIAMS.